(12) United States Patent
McGraw, IV

(10) Patent No.: US 8,560,888 B1
(45) Date of Patent: Oct. 15, 2013

(54) METHOD AND APPARATUS FOR REBUILDING AN ATM COMPUTER IMAGE AUTOMATICALLY

(75) Inventor: William H. McGraw, IV, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 371 days.

(21) Appl. No.: 13/025,214

(22) Filed: Feb. 11, 2011

(51) Int. Cl.
*G06F 11/00* (2006.01)

(52) U.S. Cl.
USPC .......................................................... 714/15

(58) Field of Classification Search
USPC ........... 714/1–3, 4.1, 4.11, 4.3, 4.4, 6.13, 6.3, 714/6.31, 6.32, 15, 16
See application file for complete search history.

(56) References Cited

U.S. PATENT DOCUMENTS

| | | | |
|---|---|---|---|
| 5,715,462 A * | 2/1998 | Iwamoto et al. | 717/173 |
| 6,981,177 B2 * | 12/2005 | Beattie | 714/20 |
| 7,913,113 B2 * | 3/2011 | Gunabalasubramaniam et al. | 714/15 |
| 7,962,739 B2 * | 6/2011 | Childs et al. | 713/2 |
| 2009/0300415 A1 * | 12/2009 | Zhang et al. | 714/19 |

* cited by examiner

*Primary Examiner* — Nadeem Iqbal
(74) *Attorney, Agent, or Firm* — Weiss & Arons LLP; Michael Springs

(57) ABSTRACT

A method and apparatus for rebuilding an ATM computer image in an Automatic Teller Machine (ATM) is provided. The computer of the ATM is configured to depend on key system files. The key system file may be used to recreate a viable machine image in the event that the ATM "crashes" or some files become corrupted. If key system files are found cannot be verified upon a reboot, a copy of key system file is sought. The ATM first searches for the key system files in ATMs that are connected to a common switch. If the nearby ATMs do not have a copy of key system files than a succession of searches are made across local area networks and wide area networks. Key system files may reside on similar ATMs, dissimilar ATMs, servers, terminals and network drives. If key system files can be located then the ATM may automatically restore a viable machine image and reboot. Otherwise manual intervention is required.

23 Claims, 3 Drawing Sheets

METHOD AND APPARATUS FOR REBUILDING AN ATM COMPUTER IMAGE AUTOMATICALLY

FIELD OF TECHNOLOGY

This invention relates recovering the machine image of a computer in an Automated Teller Machine (ATM).

BACKGROUND OF THE INVENTION

An ATM is a specialized computer based system utilizing a hardware platform and software. The software may include an operating system and one or more application programs. The hardware platform consists of a computer and one or more electro-mechanical devices. The operating system is a program that runs on the computer, which creates an environment for the application programs.

At times the operating system may crash—i.e., the operating system may fail catastrophically. Typically the ATM is powered down and the operating system is rebooted, but if any of the key system files are corrupted than the operation of the ATM cannot be restored. Key system files represent the state of a machine as it should look—i.e., a valid machine image. Key system files may be called the machine image or may be used to create a valid machine image. The state of the machine may include variables, addresses of drivers and file system pointers. Often manual intervention is required to restore the operation of the ATM if the key system files are corrupted. Restoration typically requires importing or creating a valid machine image.

It would be desirable, therefore, to provide an apparatus and methods that allow automatic restoration of an ATM after an operating system crash even if the key system files have become corrupted.

SUMMARY OF THE INVENTION

An ATM, substantially as shown in and/or described in connection with at least one of the figures, as set forth more completely in the claims. The ATM may include mechanisms that permit the restoration of ATM operation system despite the corruption of key system files.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for improving the uptime and reducing maintenance costs of an ATM are provided. ATM hardware and software that support verification and replacement of key system files are provided.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

Figure 1:
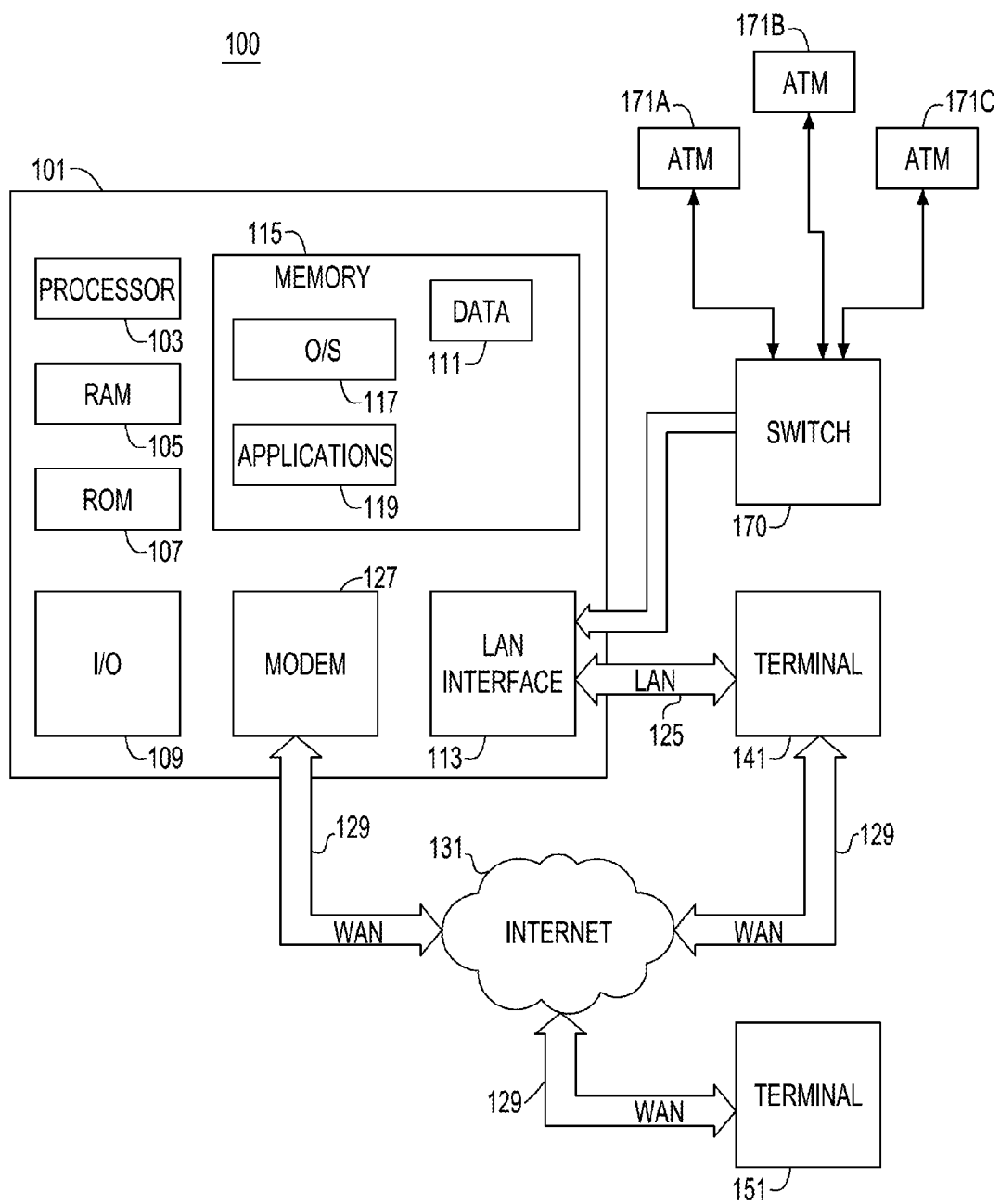
FIG. 1 is an illustrative block diagram of an ATM system 100 based on a computer 101

FIG. 1 is an illustrative block diagram of an ATM system 100 based on a computer 101. The computer 101 may have a processor 103 for controlling the operation of the ATM and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the ATM computer 101.

The memory 115 may be comprised of any suitable permanent storage technology—e.g., a hard drive. The memory 115 stores software including the operating system 117 any application(s) 119 along with any data 111 needed for the operation of the ATM system 100. Alternatively, some or all of ATM computer's executable instructions may be embodied in hardware or firmware (not shown). The computer 101 executes the instructions embodied by the software to perform various functions.

Input/output ("I/O") module 109 may include connectivity to a microphone, keypad, touch screen, and/or stylus through which a user of computer 101 may provide input, and may also include one or more speakers for providing audio output and a video display device for providing textual, audiovisual and/or graphical output. I/O module 109 may include connectivity to devices which read ATM cards or devices which dispense and/or handle items—e.g., currency in bill or coin form.

ATM system 100 may be connected to other ATMs via a network interface 113. The network interface may connect to switch 170. Several similar ATMs 171A, 171B and 171C may be connected to switch 170 and may reside in close physical proximity to ATM system 100.

ATM system 100 may also operate in a networked environment supporting connections to one or more remote computers, such as terminals 141 and 151. Terminals 141 and 151 may be personal computers or servers that include many or all of the elements described above relative to computer 101. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections and/or the connections to switch 170 shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 and or ATMs 171A-171C may also be mobile devices including various other components, such as a battery, speaker, and antennas (not shown).

ATMs 171A-171C and/or terminal 151 and/or terminal 141 may be portable devices such as a laptop, cell phone, Blackberry™, or any other suitable device for storing, transmitting and/or transporting relevant information. ATMs 171A-171C and/or terminals 151 and/or terminal 141 may be other ATMs. These ATMs may be identical to ATM system 100 or different. The differences may be related to hardware components and/or software components.

Figure 2:
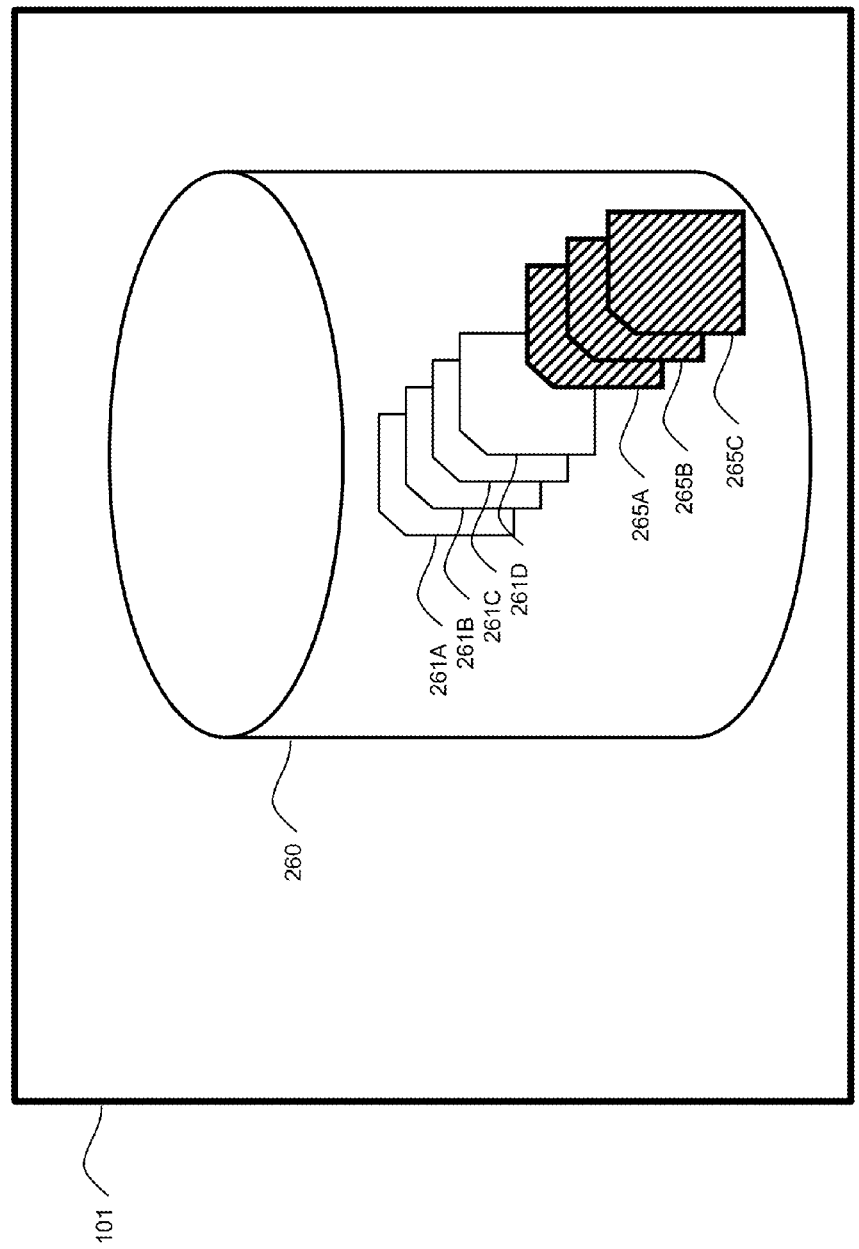
FIG. 2 shows a schematic diagram of the hardware and software components of an ATM.

FIG. 2 shows a possible implementation of the computer 101 as used in ATM system 100. Computer 101 may implement memory 115 as a hard drive 260. Other types of permanent storage may be used in place of hard drive 260 as described above. Hard drive 260 may implement a file system which stores files 261A-261D and key system files 265A-265C. The file system may also store operating system 117, applications 119 and data 111. Some of the files are key system files 265A-265C which are distinguished by diagonal pattern in FIG. 2. Damage or loss of a key system file—e.g., 265A—may render the ATM inoperative or cause a "crash". A crash may also leave a key system file in a damaged condition. Key system files 265A-265C represent the "machine image" of the computer 101. Key system files 265A-265C may allow the rebuilding of the machine image of computer 101. In the alternative, keys system files 265A-265C or may actually represent the machine image of computer 101.

Figure 3:
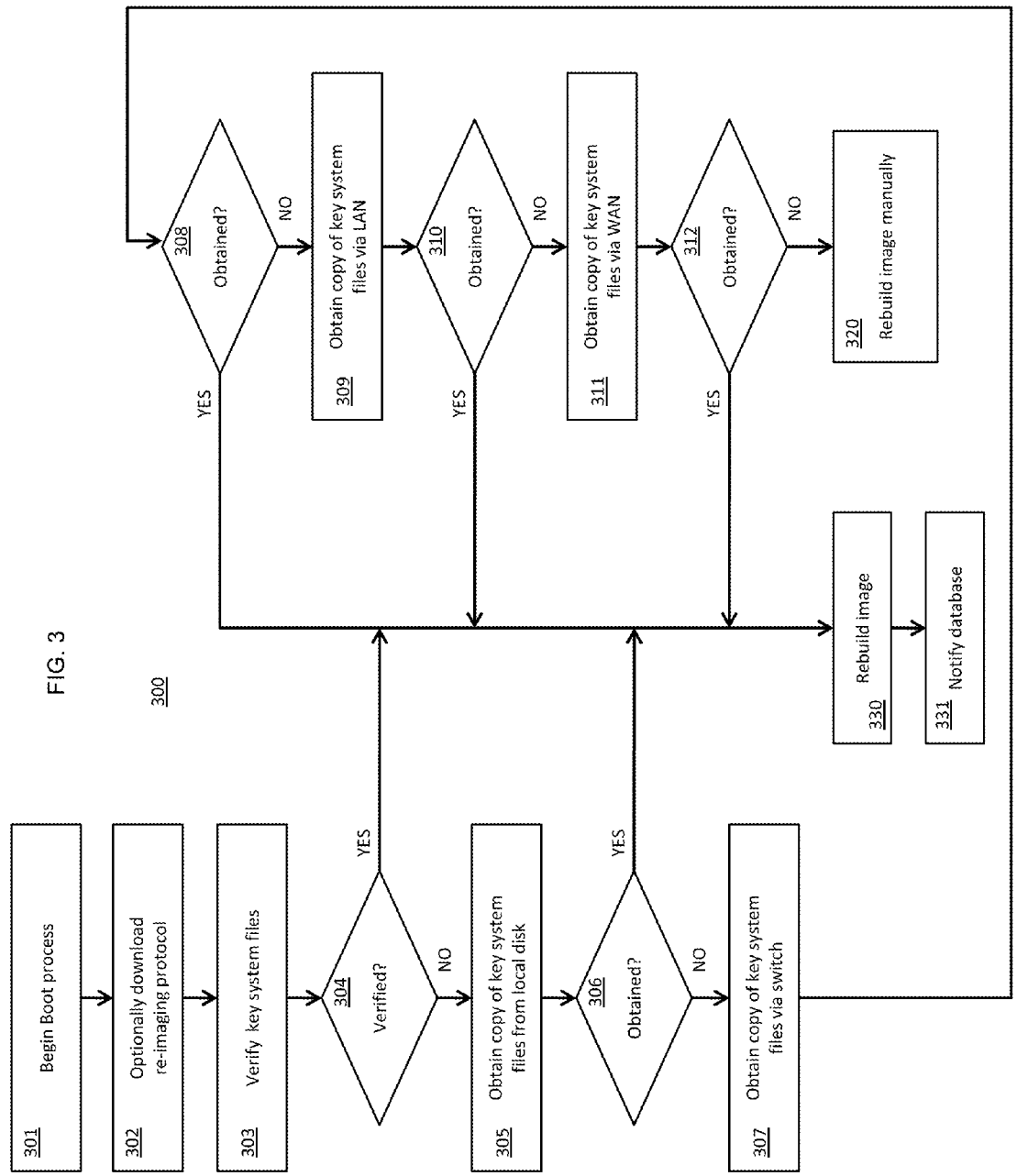
FIG. 3 shows a schematic diagram of the file system of an ATM.

When the ATM is rebooted, the boot method 300 will obtain appropriate key system files as shown in FIG. 3. At step 301 the boot process begins. At step 302 the computer 101 optionally downloads a re-imaging protocol from a central server. Other embodiments of the invention may include downloading re-imaging protocols or instruction from any machine that provides key system files. Still other embodiments may download a re-imaging protocol only when the local files fail to verify or any other suitable step in the boot method 300.

At step 303 the computer 101 may verify the condition of the key system files prior to loading the operating system. Verified key system files represent viable information that can be used to rebuild a machine image and allow the ATM to reboot. If the key system files 265A-265C are verified than the image of the machine may be rebuilt or simply reloaded at step 330. Several methods can be used to verify the key system files including but not limited to comparing the current checksum against a stored checksum, measuring the consistency of the file structure or any other suitable method.

After the computer 101 has been re-imaged a centralized database (not shown) may be notified of the re-imaging activity at step 331. The centralized database may be used to keep maintenance records of individual ATMs or any other suitable purpose. In an alternative embodiment the database may be a server.

If the key system files cannot be verified at step 304, than an undamaged version of the key system files may be obtained. In the first instance, the replacement key system files may be stored elsewhere on hard drive 260 and obtained at step 305. If a copy of key system files 265A-265C is available on hard drive 260 then the system is rebooted and the machine image may be rebuilt using the viable copy at step 330. Following the reboot of the ATM the centralized database may be notified at step 331.

If hard drive 260 does not contain a viable copy of the key system files 265A-265C then step 306 may direct the boot process to obtain a viable copy from nearby machines. Computer 101 of ATM system 100 may contact nearby ATMs 171A-171C via switch 170 at step 307. If one of the nearby ATMs 171A-171C has a copy of key system files 265A-265C then this copy may be sent to computer 101 via switch 170. Once a copy of key system files 265A-265C is available on hard drive 260 then the system may be rebooted (or continue to boot) and the machine image rebuilt using the viable copy at step 330 and the database notified at 331.

If computer 101 of ATM system 100 is not able to obtain a copy via switch 170, step 308 may direct the boot process to contact nearby machines—e.g., terminal 141—via LAN 125. Since the local area network is "local", the machines connected by the LAN 125 may be nearby. Terminals—e.g., terminal 141—may be ATMs which include computers similar to computer 101. If one of the nearby machines has a copy of key system files 265A-265C then this copy may be sent to computer 101 via LAN 125 at step 309, enabling rebuilding of the machine image at step 330 and notification of the database at 331.

If none of the local machines contain a viable copy of the key system files 265A-265C then computer 101 may be directed to obtain a viable copy may sought from any connected machine at step 310. Computer 101 of ATM system 100 may contact other machines—e.g., terminal 151—via WAN 129 at step 311. Since the wide area network is "wide", the machines connected by the WAN 129 may be anywhere. At times terminals—e.g., terminal 151—may be ATMs which include computers similar to computer 101. If one of the other machines has a copy of key system files 265A-265C then this copy will be sent to computer 101 via WAN 129, enabling rebuilding of the machine image at step 330 and notification of the database at 331.

If no copy of key system files 265A-265C is available at step 312 on any connected machine then the system must be rebuilt manually at step 320. Manual re-imaging may require a repairperson to physically access the ATM system 100. In another embodiment the ATM may allow a repairperson to login to the ATM system 100 in order to download a viable machine image.

Each of ATMs 171A-171C and terminals 141,151 may be any sort of device. The devices may be similar ATMs, dissimilar ATMs, servers, terminals and network drives or any other suitable device. The devices may serve as a repository for viable copies of key system files for one type or many types of ATMs.

Although the foregoing description is related to an ATM, any other self service device or computer based system is a possible embodiment of the invention and is included within the scope of the invention.

Thus, methods and apparatus for rebuilding an ATM computer image automatically have been provided. Persons skilled in the art will appreciate that the present invention can be practiced by other than the described embodiments, which are presented for purposes of illustration rather than of limitation, and that the present invention is limited only by the claims that follow.

What is claimed is:

1. An automatic teller machine ("ATM") comprising:
   at least one central processing unit ("CPU"); and
   at least one memory;
   wherein, at least one key ATM system file is stored in the at least one memory; and
   wherein the at least one CPU is configured to:
      restore a viable machine image using the at least one key ATM system file; and
      verify the key ATM system file using a checksum, the verifying comprising:
         storing a first checksum calculated by the ATM, said first checksum being stored in the at least one memory prior to restoring the viable machine image;
         retrieving the first checksum from the at least one memory; and
         comparing a second checksum calculated by the ATM to the first checksum, wherein the second checksum is calculated after a system malfunction of the at least one key ATM system file.

2. The ATM of claim 1 wherein the at least one key ATM system file can be replaced by a copy of the key ATM system files stored on the at least one memory.

3. The ATM of claim 1 further comprising connection to at least one switch, wherein the at least one switch is connected to at least one other device, wherein the at least one device stores a copy of the key ATM system files.

4. The ATM of claim 3, wherein the at least one device is another automatic teller machine.

5. The ATM of claim 3, wherein the at least one device is a network drive.

6. The ATM of claim 1 further comprising a connection to at least one device via a local area network, wherein the at least one device stores a copy of the key ATM system files.

7. The ATM of claim 1 further comprising a connection to at least one device via a wide area network, wherein the at least one device stores a copy of the key ATM system files.

8. The ATM of claim 1 further comprising a connection to a central database, wherein a log of re-imaging activities is stored.

9. The ATM of claim 1, wherein a protocol is downloaded for re-imaging the at least on computer.

10. A method of rebuilding a machine image in an automatic teller machine ("ATM") wherein the ATM comprises at least one central processing unit ("CPU") and at least one memory, wherein the memory stores at least one key ATM system file, the method comprising:
    verifying, using the CPU, the at least one key ATM system file using a checksum, the verifying comprising:
       storing a first checksum calculated by the ATM, said first checksum being stored in the at least one memory, wherein the first checksum is calculated before a system malfunction of the at least one key ATM system file;
       retrieving the first checksum from the at least one memory; and
       comparing a second checksum calculated by the ATM to the first checksum, wherein the second checksum is calculated after the system malfunction of the at least one key ATM system file;
    acquiring at least one copy of at least one key ATM system file if the at least one key ATM system file cannot be verified;
    creating at least one machine image using the at least one copy of at least one key ATM system file; and
    rebooting the ATM using the at least one machine image.

11. The method of claim 10 wherein the ATM is a first ATM, and wherein the at least one copy of the at least one key ATM system file is stored in a second ATM.

12. The method of claim 11 wherein the second ATM is connected to the first ATM via a switch.

13. The method of claim 10 further comprising searching for the at least one copy of the at least one key ATM system file.

14. The method of claim 10 wherein the ATM is connected to:
    at least one switch, wherein at least one device is connected to the at least one switch;
    at least one local area network wherein at least one device is connected to the at least one local area network;
    at least one wide area network wherein at least one device is connected to the at least one wide area network further comprising:
       searching for at least one copy of the at least one key ATM system file on the at least on switch;
       searching for at least one copy of the at least one key ATM system file on the at least one local area network if the ATM did not find at least one copy of the at least one key system file any device connected to the switch; and
       searching for at least one copy of the at least one key ATM system file on the at least one wide area network if the automatic ATM did not find at least one copy of the at least one key ATM system file on any device connected to the at least one wide area network.

15. The method of claim 10 wherein, the ATM is a first ATM, and wherein the at least one copy of the at least one key ATM system file is acquired from a second ATM.

16. The method of claim 10 wherein the at least one copy of the at least one key ATM system file is acquired from at least one network drive.

17. The method of claim 10 wherein the at least one copy of the at least one key ATM system file is acquired via a switch.

18. The method of claim 10 wherein the at least one copy of the at least one key ATM system file is acquired via a local area network.

19. The method of claim 10 wherein the at least one copy of the at least one key ATM system file is acquired via a wide area network.

20. A method of rebuilding a machine image in an automatic teller machine ("ATM") wherein the ATM comprises at least one central processing unit ("CPU") and at least one memory, wherein the memory stores at least one key ATM system file, the method comprising:
    beginning the hooting of the at least one ATM;
    verifying, using the CPU, the at least one key ATM system file using a checksum, the verifying comprising:
       calculating a first checksum, said first checksum being stored in the at least one memory prior to creating a machine image;
       retrieving the first checksum from the at least one memory; and comparing a second checksum to the first checksum, wherein the second checksum is calculated by the ATM after a system malfunction of the at least one key ATM system file;

acquiring at least one copy of at least one key ATM system file if the at least one key system file cannot be verified;

creating at least one machine image using the at least one copy of at least one key ATM system file; and completing the booting of ATM using the at least one machine image.

21. The method of claim 20 further comprising, downloading a re-imaging protocol.

22. The method of claim 20 further comprising, notifying a server.

23. The method of claim 20 further comprising searching for the at least one copy of the at least one key ATM system file.

* * * * *